United States Patent Office 3,454,674
Patented July 8, 1969

3,454,674
GRAFTS OF VINYLCHLORIDE UPON PARTIALLY SAPONIFIED ETHYLENE-VINYL-ESTER COPOLYMERS
Dietrich Hardt, Bonn, and Herbert Bartl, Cologne-Stammheim, Germany, assignors to Farbenfabriken Bayer Aktiengesellschaft, Leverkusen, Germany, a German corporation
No Drawing. Filed Aug. 7, 1964, Ser. No. 388,276
Claims priority, application Germany, Aug. 27, 1963, F 40,593
Int. Cl. C08f *15/40, 37/16*
U.S. Cl. 260—878          5 Claims

ABSTRACT OF THE DISCLOSURE

The graft copolymer contains hydroxyl groups derived from the partial hydrolysis of the ethylene-vinyl ester copolymer and these hydroxyl groups may be cross-linked with a bifunctional agent to form cross-linked reaction products.

---

This invention relates to grafts of vinylchloride upon partially saponified copolymers of ethylene and vinyl esters and the subsequent cross-linking of such graft copolymers.

In our copending application Ser. No. 305,854, filed Aug. 30, 1963, now Patent No. 3,352,054, we have proposed to graft vinyl chloride upon copolymers of ethylene and vinyl esters. Depending on the composition, and more especially on the proportion of vinyl chloride, there are either obtained hard, impact-resistant polymers of vinyl chloride or, when higher proportions of grafting substrata are used, soft, flexible products which have the character of a soft polyvinyl chloride and can be correspondingly processed. Graft copolymers of this type are capable of being cross-linked by means of radicals by adding radical-forming substances, more especially peroxides, or by treatment with high energy radiation.

It has now been found that partially saponified ethylene-vinyl ester copolymers, more especially partially saponified copolymers of ethylene and vinyl acetate, can be subjected to graft polymerization with vinyl chloride to obtain graft polymers containing free hydroxyl groups. Due to the presence of hydroxyl groups these new graft copolymers are capable of being cross-linked by reaction with suitable cross-linking agents.

The new graft copolymers of the present invention are produced by subjecting to polymerizing conditions a mixture comprising vinylchloride and a partially saponified copolymer of ethylene and a vinyl ester of a carboxylic acid containing 1 to 8 carbon atoms in such quantities, that the graft copolymer formed has incorporated therein 5 to 70% by weight of said partially saponified ethylene-vinyl ester copolymer, said partially saponified ethylene-vinyl ester copolymer being a copolymer of ethylene having incorporated therein 30–70% by weight of at least one of said vinyl esters, 10–80% of the ester groups being saponified.

In accordance with one embodiment of the present invention, vinyl chloride is grafted on to said partially saponified copolymers of ethylene and vinyl esters in such quantities that 15–70% by weight of partially saponified grafting substratum are contained in the graft copolymer. Such products have the properties of an intrinsically plasticized polyvinyl chloride, i.e. the materials have a very low hardness factor, are flexible, easily deformable and capable of easy processing.

According to another embodiment, if the proportion of the grafting substratum in the graft copolymer is 5–15% by weight, hard graft copolymers are obtained, and these have an improved notch impact toughness by comparison with homopolymers of vinyl chloride. The partially saponified ethylene-vinyl ester copolymers are known as such. They are produced by copolymerizing ethylene and a vinyl ester, such as vinyl acetate, vinyl propionate, vinyl butyrate, vinyl benzoate, in bulk, in organic solution or in aqueous emulsion or dispersion in the presence of free radical forming polymerization catalysts and thereafter partially saponifying the ester groups of the copolymers in an acid or alkaline medium.

Suitable for the graft polymerization are both monomer-soluble and water-soluble radical formers, for example organic peroxides such as lauroyl peroxide, benzoyl peroxide, peroxydicarbonates and others, readily decomposable nitrogen compounds such as $\alpha,\alpha'$-azodiisobutyronitrile or water-soluble per compounds. The monomer-soluble initiators are particularly suitable with dispersion polymerization, whereas the water-soluble initiators, more especially persulfates or hydrogen peroxide, possibly in the presence of reducing agents, are suitable for emulsion polymerization.

These polymerization initiators are used in the quantities normally employed for similar graft polymerization process, i.e. between 0.1 and 2.5% by weight, based on the weight of polymerizable monomer. In addition, conventional polymerization auxiliaries such as dispersion agents or molecular weight and modifying agents can be used.

The grafting of vinyl chloride upon the aforementioned partially saponified copolymers can for example take place in aqueous emulsion by preparing an aqueous emulsion of the copolymer, partially hydrolyzing the copolymer and then reacting the copolymer with vinyl chloride.

However, the method of suspension polymerization which is described hereinafter is of particular importance, as this method provides the highest degree of grafting and the most interesting products. In accordance with this form of the invention, the partially saponified copolymer together with the activator is dissolved at room temperature in monomeric vinyl chloride, the solution is dispersed with a dispersion agent in water and polymerization is effected by raising the temperature. In case that activators are used which start the polymerization at comparatively low temperatures the activators are preferably added after the polymerization components have been mixed and, if desired, dispersed in water. The polymerization temperatures are generally kept at 10–100° C., preferably 20–80° C. The graft copolymers of vinyl chloride on partially saponified ethylene-vinyl ester copolymers are colorless fine bead-like products which are readily soluble in organic solvents such as cyclohexanone, tetrahydrofuran or dioxane. By extrusion, injection-moulding or calendering, it is possible to produce therefrom shaped elements which are scarcely distinguished from polyvinyl chloride as regards the workability thereof. Those types which have a content of ethylene-vinyl ester hydrolysate of about 25–70% deserve particular interest, as they have a similar behaviour to plasticized polyvinyl chlorides but can be processed and used without plasticizers. On account of this possibility of being processed without using plasticizers, these products are particularly useful in those special spheres where physiologically unobjectionable substances must be used. The graft copolymers of the present invention are furthermore distinguished by a low tendency of taking up electrostatic charges.

Fillers, pigments or additional plasticizers can also be incorporated without thereby causing any serious detriment to the cross-linking.

The free hydroxyl groups of the graft copolymers, prepared by the present process, are available for cross-linking reactions with bifunctional or higher polyfunctional agents which react with OH groups. As bifunctional or higher polyfunctional compounds which are capable of reacting with hydroxyl groups of the said graft copolymers, the following are mentioned as those of particular importance:

(1) Organic compounds containing at least two isocyanate groups including aliphatic, cycloaliphatic, aromatic, araliphatic polyisocyanates and polyurethanes containing at least two isocyanate groups, as well as organic compounds containing at least two blocked isocyanate groups, which are split up, such as hexamethylene diisocyanate, toluylene-2,4- or -2,6-diisocyanates, dimerised toluylene-2,4-diisocyanate, naphthylene-1,5-diisocyanate, diphenylmethane-4,4'-diisocyanate, triphenylmethane triisocyanate, reaction products of polyhydric alcohols, such as trimethylol propane, pentaerythrit, glycerol, and diisocyanates, (2) Organic compounds containing at least two methylol groups which may be etherified with aliphatic or cycloaliphatic monohydric alcohols having 1–6 carbon atoms, such as methanol, ethanol, propanol, butanol. Suitable compounds of this type are soluble reaction products of aldehydes, preferably formaldehyde, with phenols, ureas, thioureas, aminotriazines, such as melamine or other aminoplasts and the etherified derivatives thereof. In addition, it is of course possible to cross-link with other polyfunctional compounds which are capable of reacting with hydroxyl groups, provided that these cross-linking agents are compatible with the graft copolymers. Examples are such compounds as dianhydrides of polycarboxylic acids, polyfunctional epoxide compounds, aluminium-acetoacetic acid esters and others.

The quantity of the cross-linking components which is introduced obviously depends on the required degree of cross-linking. Using this procedure, there are obtained products which vary in properties from those which are swellable up to those which are completely insoluble in organic solvents, which products can be used for foils, coatings, impregnations, anticorrosion coatings and similar uses. The cross-linking agents are generally applied in amounts of 0.5–20%, preferable 1–10% by weight as calculated on the weight of graft copolymers. The temperature at which cross-linking is effected may vary between 10 and 160° C.

This method of cross-linking is advantageous by comparison with the cross-linking of graft copolymers containing non-saponified ethylenevinyl ester copolymer by means of radical forming compounds, such as peroxides, in that when cross-linking with the aforementioned cross-linking components (for example diisocyanates), it is possible to work at lower temperatures by comparison with the vulcanization carried out with peroxides. It is of course also possible to cross-link the graft copolymers of the present invention by means of radical forming compounds.

In the following examples the parts indicated are parts by weight.

Example 1

In an autoclave, 600 parts of a copolymer of 55% by weight of ethylene and 45% by weight of vinyl acetate, 61% of the ester groups of which have been removed hydrolytically, 900 parts of vinyl chloride, 3300 parts of water, 20 parts of methyl cellulose and 3 parts of azodiisobutyronitrile are stirred vigorously for 5 hours at room temperature. Polymerization is thereafter carried out for 15 hours at 60° C.

There are obtained 1120 parts of a colorless polymer, which is completely soluble in tetrahydrofuran; it is composed of Partially hydrolyzed ethylene vinyl acetate copolymer _____percent by weight__ 53.5
Copolymerized vinyl chloride _____do____ 46.5
Strength _____kg./cm.$^2$__ 130

Shore hardness _____ 92/45
Elongation at break _____percent__ 432

Example 2

300 parts of an ethylene-vinyl ester copolymer with a vinyl acetate content of 52%, of which 35% of the acetyl groups have been split off, 1200 parts of vinyl chloride, 3300 parts of water, 20 parts of methyl cellulose and 3 parts of azodiisobutyronitrile are vigorously stirred for 5 hours at room temperature in an autoclave. Polymerization thereafter takes place for 15 hours at 60° C.

There are formed 1360 parts of a colorless bead polymer which contains 22% by weights of hydrolyzed copolymer.

Example 3

Cross-linking of the polymers obtained according to Examples 1 and 2:

(a) 10 parts of the polymer of Example 1 are dissolved in tetrahydrofuran and cross-linked with 1, 3 and 5% by weight of hexamethylene diisocyanate. Films are cast, these are left to dry in air and are then heated for 15 minutes at 120° C. All films are insoluble in tetrahydrofuran.

The same result is obtained if 5% by weight of the hexamethylether of N-hexamethylol melamine is used as cross-linking agent.

(b) If in a similar manner 10 parts of the polymer of Example 2 are cross-linked with 1.3 and 5% by weight of hexamethylene diisocyanate or hexamethylene ether of N-hexamethylol melamine, complete cross-linking occurs to the stage of insolubility.

Example 4

A stirrer-type autoclave is charged with 150 parts of a copolymer of ethylene and vinyl acetate with a vinyl acetate content of 45%, of which 50% of the acyl groups have been split off hydrolytically, 1350 parts of methyl cellulose and 3 parts of azodiisobutyronitrile. The mixture is stirred for 5 hours at room temperature and thereafter heated while stirring vigorously for 15 hours at 60° C.

There are obtained 1110 parts of a colorless bead polymer, which can be extruded or injection-moulded to form impact-resistant moulded elements. The product contains 13.5% of hydrolyzed ethylene-vinyl acetate copolymer.

Strength.—279
Elongation at break.—96%
Limiting bending stress.—436
Impact toughness.—Not broken
Notch impact toughness.—15.2 (−5° C: 5.8)
Ball-pressure hardness.—720/680

Example 5

800 parts of a copolymer of ethylene and vinylacetate having incorporated therein 30% by weight of vinylacetate, 30% of the ester groups of which are saponified, 200 parts of water, 1200 parts of vinyl chloride, 40 parts of methyl cellulose and 1 part of azodiisobutyronitrile are stirred vigorously for 6 to 8 hours at room temperature. Polymerization is started by raising the temperature to 60–62° C. The reaction mixture is kept for 15 hours while stirring vigorously at this temperature to complete the polymerization. There are obtained 1597 parts of a finely dispersed bead polymer having incorporated therein 50.1% by weight of the partially saponified copolymer and 49.9% by weight of vinyl chloride. The hydroxyl content of the graft copolymer is 0.55% by weight. The product is completely soluble in tetrahydrofuran.

Example 6

The following reaction mixture is subjected to the polymerization conditions outlined in Example 5:

| | Parts |
|---|---|
| Water | 3000 |
| Copolymer of ethylene and vinyl acetate having incorporated therein 66% by weight of vinyl acetate, 40% by weight of which have been saponified | 650 |
| Vinyl chloride | 850 |
| Polyvinyl alcohol | 30 |
| Azodiisobutyronitrile | 1 |

There are obtained 940 parts of a finely dispersed bead polymer having incorporated therein 69% of the partially saponified copolymer and 31% of vinyl chloride. The hydroxyl content is 4.2% by weight. The polymer is easily soluble in tetrahydrofuran. If the amount of catalyst and/or the polymerization temperature is increased there is obtained a polymer having a higher content of copolymerized vinyl chloride.

Example 7

4000 parts of a copolymer of ethylene and 45% by weight of vinyl acetate, 29% of the ester groups of which are saponified, 6000 parts of vinyl chloride, 20,000 parts of water, 60 parts of methyl cellulose and 4 parts of azodiisobutyronitrile are vigorously stirred for 5 hours at room temperature in an autoclave. Thereafter the temperature is raised to 60° C. and the reaction mixture is kept at this temperature by vigorously stirring for further 15 hours. There are obtained 8297 parts of a finely dispersed bead polymer, having incorporated therein 52% of vinyl chloride and 48% of the partially saponified copolymer. The chloride content is 29.1%, the hydroxyl content 1.2%. K-value=63.5.

The graft copolymer is completely soluble in tetrahydrofuran, cyclohexanon or dioxane. Transparent, rigid and elastic films are obtained by casting solutions of the graft copolymer on a support and evaporating the solvent.

The partially saponified ethylene-vinyl ester copolymers used for the production of the present graft copolymers are normally solid, film forming products which have an intrinsic viscosity $[\eta]$ of 0.1 to 1.4 as measured in p-xylene, tetrahydrofuran or pyridine.

We claim:
1. A graft copolymer of vinylchloride upon a partially saponified copolymer of ethylene and a vinyl ester of an organic carboxylic acid having 1 to 8 carbon atoms, said graft copolymer having incorporated therein 5 to 70% by weight of said partially saponified copolymer, said partially saponified copolymer being a copolymer of ethylene having incorporated therein 30 to 70% by weight of said vinyl ester, 10–80% of the ester groups of said ethylene copolymer being transformed into hydroxyl groups by saponification.
2. The graft copolymer of claim 1 wherein said vinyl ester is vinyl acetate.
3. A cross-linked reaction product of the graft copolymer of claim 1, with a cross-linking agent containing at least two groups capable of reacting with the hydroxyl groups of said graft copolymer to form cross-linked reaction products.
4. The cross-linked reaction product of claim 3, wherein said cross-linking agent is selected from the group consisting of organic compounds containing at least two isocyanate groups, compounds containing at least two methylol groups, and compounds containing at least two etherified methylol groups.
5. The graft copolymer of claim 1 wherein said organic carboxylic acid on which the vinyl ester component of said copolymer is based has from 1 to 6 carbon atoms and said graft copolymer has incorporated therein 15–70% by weight of said partially saponified copolymer.

References Cited

UNITED STATES PATENTS

| 3,305,606 | 2/1967 | Hardt et al. | 260—878 |
| 3,111,500 | 11/1963 | Bartl et al. | 260—878 |

MURRAY TILLMAN, *Primary Examiner.*

J. T. GOOLKASIAN, *Assistant Examiner.*

U.S. Cl. X.R.

260—853